(No Model.)
J. P. CALLAN.
VEHICLE SPRING.
No. 295,228. Patented Mar. 18, 1884.
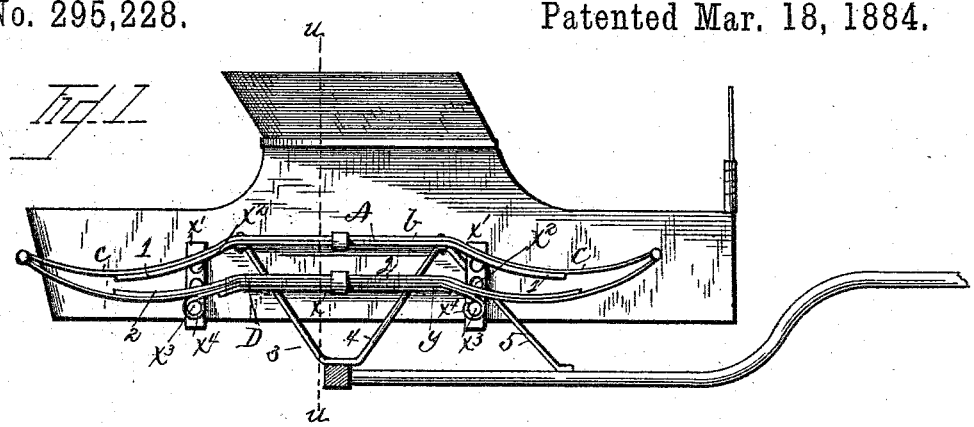
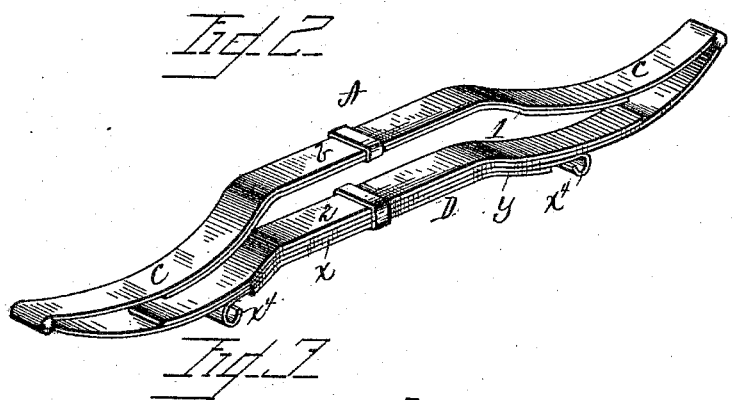
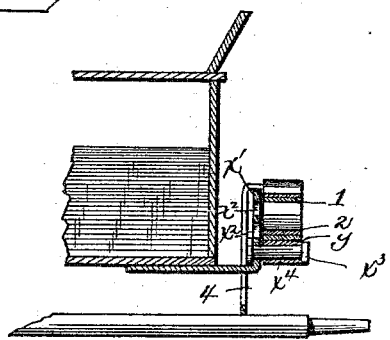
WITNESSES
Franck L. Ourand
G. Sargent Elliott
INVENTOR
John P. Callan
By John J. Halsted & Son
his Attorneys

United States Patent Office.

JOHN P. CALLAN, OF AURORA, ILLINOIS.

VEHICLE-SPRING.

SPECIFICATION forming part of Letters Patent No. 295,228, dated March 18, 1884.

Application filed January 8, 1884. (No model.)

*To all whom it may concern:*

Be it known that I, JOHN P. CALLAN, of Aurora, in the county of Kane and State of Illinois, have invented certain new and useful Improvements in Springs for Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention, which consists in a special construction of spring and in its application to the vehicle, will be readily understood from the following:

Figure 1 illustrates a part of a vehicle with my improved springs applied thereto. Fig. 2 is a perspective view of the spring, and Fig. 3 is a section through the line $u\,u$ of Fig. 1.

A is the upper half of my improved spring, made somewhat in the shape of an Indian bow, and having its central part, $b$, substantially straight, and its extremities $c$ curved, and preferably curved upward, as shown; and I connect with this one or more shorter leaves, 1, attached to its under side.

D is the lower half of my spring, of a shape similar to the upper half, A, and coupled at its ends to the ends of the half A by an ordinary button or shackle, and this half D may have one or more shorter leaves, 2, attached to its upper side. This construction, as will now be observed, renders it applicable for having the portions A D pressed or pulled apart from each other when in use, instead of being compressed toward each other after the usual manner of elliptic and similar springs.

My mode of connecting this improved spring to a vehicle is as follows: Taking a two-wheeled vehicle or village or dog cart as an illustration, the upper half or portion, A, I connect at its straight part $b$ to the axle and shafts by rigid braces or supports 3 4 5 underneath the spring, the supports 3 and 4 diverging upward from the axle and supporting the spring firmly, and the supports 5, which connect to the shafts at points forward of the axle, serve also as braces for the whole structure.

Thus far, as will be seen, the body of the vehicle has no relation to the spring, as it is not directly connected to nor does it rest on the upper portion, A. On the contrary, the body rests on or is suspended either from the upper or lower side of the lower half, D, and at its central or straight part, about six to eight inches each side of center; and this straight part gives a firm and extended support, as distinguished from connecting the spring at a single point.

When in use, the weight of the load comes directly on the lower half, D, and this action pulls the portions A and D in a direction away from each other, instead of pressing them nearer together.

Beneath the lower half, D, of the spring, I attach an additional short spring, $x$, with one or more leaves, $y$.

The body of the vehicle is arranged to be adjusted higher or lower, with reference to the different sizes of horses, by means of the supports $x'$ of the body, and in which jacks are made one or more holes, $x^2$, one above another, to receive the bolts $x^3$, which are connected to the respective ends of loops $x^4$. The short spring $x$, I clip to the lower side of the lower half, D. By these means either the front or the back of the body, or both front and back, may be raised or lowered, as desired.

The described spring may be used in a reversed position—that is, with the part A beneath the part D, or, in other words, upside down. In such case, however, the loops $x^4$ and the jacks $x'$ and bolts $x^3$, as will be evident, will be at the top of the spring. In this reversed position the spring will act as a compressed spring.

Besides other advantages due to my construction and arrangement, as first above described, the following may be named: The greater the load the farther apart are the portions A and D, and the battering and hammering which attend a compressed spring when fully compressed are absolutely avoided, for every increase of the load upon my spring lessens the liability of the members of the spring to come into contact.

It will be seen that this spring, with its braces 3 4 5, contributes much to the strength and durability of the vehicle, and that as the weight comes directly on the lower half, while any rocking or horse motion would be imparted not directly to such lower half, but to the upper half only, the body will be comparatively free from such motion.

My improved spring may be applied to a great variety of vehicles, and where there are no shafts extending back to the axle the brace may at its lower end rest on any other convenient part of the vehicle.

My invention is especially of value in all vehicles where the load is to be supported directly underneath the center of the load and of the spring.

I claim—

1. The vehicle-spring constructed as described—that is, of the two parts or halves A and D, each having a central part substantially straight, terminating at each end in a curve, these parts being jointed at their extremities, the upper half having leaves on its under side, and the lower half having leaves on its upper side—the springs being applied to the vehicle with the body or weight connected directly underneath to the lower half, D, and with the additional springs underneath the lower half, as shown and described.

2. In combination, the described spring, consisting of the parts A and D, constructed as set forth, the braces 3 and 4, connecting the upper part, A, to the axle, the braces 5, connecting the same part to the shafts, and the body supported by or upon or underneath the lower half, D, of the spring.

JOHN P. CALLAN.

Witnesses:
M. O. SOUTHWORTH,
A. J. KING.